United States Patent [19]

Dodd et al.

[11] Patent Number: 5,069,730

[45] Date of Patent: Dec. 3, 1991

[54] WATER-SOLUBLE SOLDERING PASTE

[75] Inventors: Courtney V. Dodd, Oklahoma City, Okla.; John R. Morris, Cranbury, N.J.; Gregory C. Munie, Naperville, Ill.

[73] Assignee: AT&T Bell Laboratories, Murray Hill, N.J.

[21] Appl. No.: 646,556

[22] Filed: Jan. 28, 1991

[51] Int. Cl.$^5$ .............................................. B23K 35/34
[52] U.S. Cl. ........................................ 148/23; 148/24; 148/25; 228/180.1; 228/207
[58] Field of Search ........................... 148/23-25; 228/207, 180.1

[56] References Cited

U.S. PATENT DOCUMENTS

| | | | |
|---|---|---|---|
| 3,977,916 | 8/1976 | Stayner | 148/23 |
| 4,342,607 | 8/1982 | Zado | 148/23 |
| 4,460,414 | 7/1984 | Hwang | 148/23 |
| 4,648,547 | 3/1987 | Mahler et al. | 228/180.1 |
| 4,701,224 | 10/1987 | Zado | 148/23 |
| 4,872,298 | 10/1989 | Jacobs | 148/24 |
| 5,009,724 | 4/1991 | Dodd et al. | 148/23 |

FOREIGN PATENT DOCUMENTS

| | | |
|---|---|---|
| 61-049799 | 3/1986 | Japan . |
| 61-074538 | 4/1986 | Japan . |
| 62-006796 | 1/1987 | Japan . |
| 62-016899 | 1/1987 | Japan . |
| 62-101396 | 5/1987 | Japan . |
| 62-158710 | 7/1987 | Japan . |
| 62-224496 | 10/1987 | Japan . |
| 62-248596 | 10/1987 | Japan . |
| 63-088085 | 4/1988 | Japan . |
| 63-115693 | 5/1988 | Japan . |
| 1493430 | 7/1989 | U.S.S.R. . |

*Primary Examiner*—Peter D. Rosenberg
*Attorney, Agent, or Firm*—Robert B. Levy

[57] ABSTRACT

A water soluble solder paste, which does not adversely impact the surface insulation resistance (SIR) of a circuit board, is comprised of powdered solder, a water soluble flux (containing an activator within a water soluble vehicle), a hydrophobic surfactant preferentially absorbed over the water soluble vehicle, and a solvent within which the surfactant and flux are dissolved. The hydrophobic surfactant is chosen to be preferentially absorbed by the circuit board surface over the water soluble flux vehicle to prevent the vehicle, which is hydrophilic from becoming trapped in the board surface, thereby adversely affecting the board SIR.

12 Claims, No Drawings

WATER-SOLUBLE SOLDERING PASTE

TECHNICAL FIELD

This invention relates to a water-soluble soldering paste of the type used to solder bond components to a substrate.

BACKGROUND OF THE INVENTION

There is a clear trend in the electronics industry towards the use of surface mount components, that is, components which are mounted with their leads, or pads, directly in contact with each of a plurality of metallized areas on a major surface of a circuit board. To solder bond such surface mount components to a circuit board, a volume of solder paste is deposited (printed) onto the metallized areas on the board which are arranged in a pattern corresponding to that of the leads/pads on the component. Following deposit of the soldering paste, each component is placed on the circuit board so that its leads/pads are in contact with the corresponding solder paste-coated metallized areas on the circuit board. Thereafter the solder paste is reflowed, typically by heating the circuit board, either in an oven, or by other means, to bond the components to the board.

Presently, "RMA" type solder paste is generally used to solder bond surface mount components. This type of paste generally is comprised a rosin-based flux and solder powder which are dissolved in a solvent together with one or more rheology-modifying (thixotropic) agents. While RMA-type pastes are widely used, such pastes commonly leave rosin residues on the circuit board following paste reflow. Often, such residues must be removed either for cosmetic reasons or to improve testability of the board. Unfortunately, the rosin residues remaining after paste reflow are extremely difficult to remove unless aggressive solvents (typically, undesirable cholorfluorocarbons, or halogenated hydrocarbons) are used.

In an effort to eliminate the difficulty in cleaning residues remaining from the use of RMA pastes, water-soluble solder pastes, such as taught in U.S. Pat. Nos. 4,460,414 to J. S. Hwang, and 4,872,928 issued to W. Jacobs (herein incorporated by reference), are now being offered. As their name implies, water-soluble pastes are soluble in water, allowing post-solder cleaning of the solder paste residues left on a circuit board with water, or a mixture of water and a mild detergent. Water-soluble solder pastes differ from the RMA pastes in that they contain a water-soluble flux, typically an acid and/or amine activator carried by a glycol vehicle, in place of a rosin-based flux.

While water-soluble pastes eliminate the need to employ aggressive solvents to remove paste residues after soldering, water-soluble fluxes incur a disadvantage of their own. The water-soluble flux within current day water-soluble pastes invariably contains a glycol vehicle. During paste reflow, the circuit board, which is basically a polymer matrix, is typically heated about its glass transition temperature $T_g$, permitting the glycol molecules of the flux within the paste to diffuse into the surface of the circuit board. Once the circuit board cools, the glycol molecules become trapped in the board surface.

The trapped glycol molecules, which are hydrophillic, attract water molecules in the environment to the board surface. The water molecules attracted to the board surface tend to reduce the surface insulation resistance (SIR) of the board which is undesirable as it may adversely affect the input impedance of certain electronic components placed thereon. For this reason, many electronics manufacturers have not readily adopted water-soluble pastes, especially for applications demanding a high SIR.

Thus, there is a need for a water-soluble soldering paste whose residues may be cleaned with water and/or detergent, but which maintains a high surface insulation resistance.

SUMMARY OF THE INVENTION

Briefly, in accordance with the present invention, a soldering paste is disclosed which is both water-soluble and yet does not degrade the surface insulation of a polymer matrix substrate, such as a circuit board. The paste is comprised of a water-soluble flux (which includes a glycol vehicle and at least one activator), solder powder, a hydrophobic surfactant, and a solvent in which the flux and surfactant are dissolved so as to be carried thereby to the surface of the substrate along with the powder. The hydrophobic surfactant, typically comprising a mono-, di- or tri-alkyl or -aryl phosphate ester, or mixture thereof, is selected so as to be preferentially absorbed by the surface of the substrate over the glycol vehicle of the flux within the paste so as to prevent the glycol molecules from being absorbed by the board surface and then trapped therein. By preventing the glycol molecules from becoming trapped, the SIR of the substrate remains high, even after water rinsing.

DETAILED DESCRIPTION

The present invention is directed to a water-soluble soldering paste for use of a circuit board or similar substrate for bonding surface mount components to a major surface of the board. As will be described further, the paste of the present invention is water-soluble, allowing paste residues to be rinsed from the circuit board with water and/or detergent, yet, the paste does not lower the SIR of the circuit board.

The paste of the present invention is comprised of a water-soluble flux (which includes a glycol vehicle and activator), a solder powder, a hydrophobic surfactant which is preferentially absorbed by the surface of the substrate over the glycol in the flux, and a solvent for carrying the flux and the surfactant to the circuit board along with the solder powder. Additionally, one or more rheology-modifying agents (thixotropes) may also be added to the paste.

The solder powder within the flux of the present invention is comprised of a conventional solder alloy (tin/lead). Typically, the solder powder comprises at least 70% and as much as 95% by weight of the paste.

The water-soluble flux within the paste is comprised of polyethylene glycol (or a mixture) thereof together with one or more activators, such as amine, an organic acid (e.g., citric, tartaric, glycolic etc.) or an aminehydrohalide such as diethanolamine hydrochloride. Typically, the activators collectively comprise 0.5%–10% by weight of the flux, with the typical ranges for the amine, organic acid and aminehydrohalide being 0–20% by weight, 0–20%, and 0–5%, respectively, (all percentage weights of the individual activator components measured without the solder powder), the remainder of the flux being polyethylene glycol.

As discussed above, printed circuit boards are generally comprised of a polymer matrix which, during soldering, is usually heated above its transition glass temperature $T_g$. When a conventional water-soluble paste is applied to the circuit board during soldering, some of the hydrophilic polyglycol molecules in the flux of the paste tend to fill the interstices in the matrix of the board created when the board is heated above $T_g$. Once the circuit board cools, the hydrophilic polyglycol molecules become trapped and remain in the matrix of the board, even after cleaning. The trapped hydrophilic polyglycol molecules tend to attract water to the surface of the circuit board under conditions of high humidity, reducing the board's SIR.

To avoid this result, the paste of the present invention advantageously includes a hydrophobic surfactant comprised of either a mono-, di- or tri-alkyl or -arly phosphate ester (or mixture thereof) which is preferentially absorbed by the circuit board surface over the glycol vehicle in the flux.

Typically, the hydrophobic group of the surfactant is chosen from one of the following classes:

a) straight or branched carbon chains containing an alkyl group in which the molecular weight of the alkyl chain is greater than 48;

b) straight or branched carbon chains containing an aryl chain in which the weight of the chain is greater than 189;

c) straight or branch chain hydrophobes (alkyl and-/or arly groups) connected to the phosphate group by one or more polyethylene oxide or polypropylene oxide chains. In the case of a polyethylene oxide chain, its content must be kept to a minimum while the chain of alkyl and aryl groups should be in excess of 48 and 189, respectively, as set forth above. For the polypropylene oxide, there may be up to 5 glycol units for alkyl and aryl groups having a minimum molecular weight of 48 and 189, respectively. Increasing the polypropylene oxide chain requires a corresponding increase in the size of the alkyl and aryl chains to maintain the same SIR level.

The quantity of the hydrophobic surfactant is chosen to be between 0.5–15% by weight of the flux, where the flux comprises everything present in the paste except the powdered metal. The exact proportions are determined by the hydrophobic nature of the surfactant and the desired level of SIR, as well as the effects of the surfactant ester on other properties of the paste, such as its theology, printability, slump resistance and reflow characteristics.

Commercial brands of hydrophobic surfactants which have been found useful include the following:

| Trade Name | Source | Description |
|---|---|---|
| CRODAFOS N3 | Croda Chemical New York, NY | A mixture of 35–45% mono-, 50–60% di-phosphate ester in which the hydrophobic chain consists of a C-18 group attached to the phosphate group by a chain of three ethylene oxide groups |
| CRODAFOS CAP | Croda Chemical New York, NY | A mixture of 75% mono-, 25% di-phosphate ester in which the hydrophobic chain consists of a C-16 group attached to the phosphate group by a chain of ten propylene oxide groups |
| EMPHOS PS400 | Witco Chemical | A mixture of C8–C10 alkyl phosphates |
| MONOFAX 939 | Mona Industries Patterson, NJ | A mixture of aliphatic phosphates |
| ANTARA LE500 | Rhone-Poulenc Inc. Princeton, NJ | A mixture of phosphate esters |
| GAFAC RS410 | Rhone-Poulenc Inc. Princeton, NJ | Poly(oxy,1,2-ethanediyl),-α-tridecyl-Ω-hydroxy phosphate |

EXAMPLE I

A first embodiment of the water-soluble paste of the present invention was obtained by mixing a hydrophobic surfactant (CRODAFOS CAP) with a commercially available water-soluble paste, Senju No. 506A, manufactured by Senju Metals Ltd., Tokyo, Japan in amounts of 5%, 10% and 15% of the weight of the paste. The Senju paste is believed to be comprised (by % weight) of at least 70% solder powder, 0.5–10% of activator, the remainder being vehicle (typically polyglycol) dissolved in a solvent. Proprietary rheology-modifying agents, and other materials are also typically present in small quantities.

The SIR results for this paste were obtained by printing the paste on circuit board coupons of standard design. The coupons were then subjected to a heat and humidity (35° C. 90% RH) in an enclosed oven while a test voltage of approximately 100 volts was applied to the paste-coated metallized areas on the coupons.

| | Average log 10 SIR | |
|---|---|---|
| % Surfactant | 24 Hr. | 48 hr. |
| 0 | 8.2 | 8.0 |
| 5 | 10.1 | 9.9 |
| 10 | 10.5 | 10.3 |
| 15 | 10.5 | 10.3 |
| Control Coupon | 9.9 | 10.0 |

By adding hydrophobic surfactant to the Senju 506A water-soluble flux, the SIR of the circuit board coupon dramatically increased as compared to the coupon coated with the paste lacking the surfactant.

EXAMPLE II

A second embodiment of the water-soluble paste of the present invention was obtained by mixing a hydrophobic surfactant (CRODAFOS CAP) with a commercially available water-soluble paste, Kester No. RS72 manufactured by Kester Metals, Corp., Des Plaines, Ill. in amounts of 5%, 10% and 15% of the weight of the paste. The Kester paste is believed to be comprised (by % weight) of at least 70% solder powder, 0.5–10% of activator, the remainder being vehicle (typically polyethylene glycol) dissolved in a solvent. Proprietary rheology-modifying agents, and other materials are typically present in small quantities.

The SIR results for this paste were obtained by printing the paste on circuit board coupons of standard design. The coupons were then subjected to a heat and humidity (35° C. 90% RH) in an enclosed oven while a test voltage of approximately 100 volts was applied to the paste-coated metallized areas on the coupons.

| % Surfactant | Average log 10 SIR | |
| --- | --- | --- |
| | 24 Hr. | 48 hr. |
| 0 | 9.1 | 7.9 |
| 5 | 9.4 | 8.4 |
| 10 | 8.4 | 8.2 |
| 15 | 8.8 | 8.3 |
| Control Coupon | 8.9 | 8.8 |

While the SIR measurements of the Kester paste with the added hydrophobic surfactant are less dramatic than that for the Senju paste, nevertheless, the SIR after 48 hours for the paste containing the surfactant was significantly better than the paste lacking the surfactant.

EXAMPLE III

A third embodiment of the water-soluble paste of the present invention was obtained by mixing a hydrophobic surfactant (CRODAFOS CAP) with a commercially available water-soluble paste, Alpha No. WS1195 manufactured by Alpha Metals Corp., Jersey City, N.J. in amounts of 5%, 10% and 15% of the weight of the paste. The Alpha paste is believed to be comprised (by % weight) of at least 70% solder powder, 0.5–10% of activator, the remainder being vehicle (typically polyethylene glycol) dissolved in a solvent. Proprietary rheology-modifying agents, and other materials are typically present in small quantities.

The SIR results for this paste were obtained by printing the paste on circuit board coupons of standard design. The coupons were then subjected to a heat and humidity (35° C. 90% RH) in an enclosed oven while a test voltage of approximately 100 volts was applied to the paste-coated metallized areas on the coupons.

| % Surfactant | Average log 10 SIR | |
| --- | --- | --- |
| | 24 Hr. | 48 hr. |
| 0 | 7.1 | 7.0 |
| 5 | 7.3 | 7.2 |
| 10 | 7.3 | 7.1 |
| 15 | 7.3 | 7.2 |
| Control Coupon | 8.9 | 8.8 |

The SIR measurements for Alpha paste only showed a modest increase for the surfactant-containing paste, as compared to the sample lacking the surfactant.

The reason for the differences between the SIR measurements for the Senju, Kester and Alpha pastes is not very well understood. One possible explanation is that such differences are attributable to the surface free energy of the hydrophillic surfactants present in such pastes. The rate and adsorption of material on a surface is governed by the change in free energy that occurs during the adsorption process. The material which when adsorbed, yields the lowest free energy, is the material which will be preferentially adsorbed. In accordance with the present invention, a hydrophobic surfactant is added to a water-soluble paste containing powdered solder and a water-soluble flux (which typically includes hydrophillic surfactants such as polyethylene glycol), for preferential adsorption over the hydrophillic surfactants.

Depending of the nature of the materials in each paste, some of which are proprietary, the preferential adsorption of our hydrophobic surfactant may or may not be successful. In the Senju paste, our hydrophobic surfactant was, indeed, successful in being preferentially adsorbed over the hydrophilic surfactants in the paste whereas in the Kester paste, the hydrophobic surfactant was only partially successful in being preferentially adsorbed. With the Alpha paste, it would appear that there are hydrophillic surfactants inherent in the paste which yield a lower surface free energy than our hydrophobic surfactant, and thus such the hydrophillic surfactants were more successful in being preferentially adsorbed.

The foregoing discloses a solder paste that is both water-soluble, yet yields a high SIR value, which is obtained by the presence of a hydrophobic surfactant in the paste which is preferentially adsorbed over any hydrophilic surfactants therein.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A water-soluble soldering paste for solder bonding components to a substrate and for effectively preventing absorption of hydrophilic material into the substrate to allow the substrate to maintain a high Surface Insulation Resistance (SIR) following soldering, comprising:
    powdered solder;
    a water-soluble soldering flux containing at least a water-soluble vehicle and an activator;
    a hydrophobic surfactant which is preferentially adsorbed over the flux vehicle by the surface of the substrate to render the substrate surface substantially hydrophobic; and
    a solvent in which the water-soluble flux and the hydrophobic surfactant are dissolved.

2. The paste according to claim 1 wherein:
    the hydrophobic surfactant is selected from the group of mono-, di-, trialkyl and -aryl phosphate esters and mixtures thereof.

3. The paste according to claim 2 wherein:
    the hydrophobic surfactant is chosen from the group consisting of straight or branched carbon chain containing an alkyl group in which the molecular weight of the alkyl chain is greater than 48.

4. The paste according to claim 2 wherein:
    the hydrophobic surfactant is chosen from the group consisting of straight or branched carbon chains containing an aryl group in which the molecular weight of the aryl chain is greater than 189.

5. The paste according to claim 2 wherein:
    the hydrophobic surfactant is chosen from the group consisting of straight or branched carbon chains containing an alkyl group and/or aryl groups in which the chain is connected to a phosphate group by an oxide selected from one of the group of polypropylene and polyethylene oxides.

6. The paste according to claim 1 wherein:
    the hydrophobic surfactant comprises 0.5–15% by weight of the flux.

7. A water-soluble soldering paste for solder bonding components to a substrate and for effectively preventing adsorption of hydrophilic material into the substrate to allow the substrate to maintain a high Surface Insulation Resistance (SIR); following soldering comprising:

at least 70% by weight powdered solder;

the remainder being a water-soluble soldering flux containing at least a water-soluble vehicle and an activator;

wherein between 0.5-15% of the weight of the flux is a hydrophobic surfactant which is preferentially adsorbed over the flux vehicle by the surface of the substrate to render the substrate surface substantially hydrophobic.

8. The paste according to claim 7 wherein:

the hydrophobic surfactant is selected from the group of mono-, di-, trialkyl and -aryl phosphate esters and mixtures thereof.

9. The paste according to claim 8 wherein:

the hydrophobic surfactant is chosen from the group consisting of straight or branched carbon chain containing an alkyl group in which the molecular weight of the alkyl chain is greater than 48.

10. The paste according to claim 8 wherein:

the hydrophobic surfactant is chosen from the group consisting of straight or branched carbon chains containing an aryl group in which the molecular weight of the aryl chain is greater than 189.

11. The paste according to claim 8 wherein:

the hydrophobic surfactant is chosen from the group consisting of straight or branched carbon chains containing an alkyl group and/or aryl groups in which the chain is connected to a phosphate group by an oxide selected from one of the group of polypropylene and polyethylene oxides.

12. A method for soldering a conductive member of a component to a corresponding metallized area on a printed circuit board and for effectively preventing adsorption of hydrophilic material into the substrate to allow the substrate to maintain a high Surface Insulation Resistance (SIR) comprising the steps of:

printing a water-soluble paste, comprised of powdered solder, a water-soluble flux containing an activator carried by a vehicle, a hydrophobic surfactant which is preferentially adsorbed by the circuit board over the water-soluble flux vehicle, and a solvent in which water-soluble flux and hydrophobic surfactant are dissolved, onto the metallized areas on the circuit board;

placing the component so each of its conductive members is in contact with a corresponding paste-coated metallized area on the circuit board;

reflowing the paste to bond the component's conductive members to the corresponding metallized areas on the circuit board; and aqueously cleaning the circuit board after paste reflow to remove any residues therefrom.

* * * * *